US012736937B2

(12) United States Patent
Nahulan et al.

(10) Patent No.: US 12,736,937 B2
(45) Date of Patent: Sep. 15, 2026

(54) DYNAMIC ROBOTIC TASK EXECUTION OPTIMIZATION WITH PROOF OF CONCEPT INTEGRATION

(71) Applicant: INTERNATIONAL BUSINESS MACHINES CORPORATION, Armonk, NY (US)

(72) Inventors: Jessica Nahulan, Vaughan (CA); Jennifer Marie Hatfield, Portland, OR (US); Sarbajit Kumar Rakshit, Kolkata (IN); Carolina Garcia Delgado, Zapopan (MX)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 2 days.

(21) Appl. No.: 18/961,608

(22) Filed: Nov. 27, 2024

(65) Prior Publication Data

US 2026/0147324 A1 May 28, 2026

(51) Int. Cl.

*B25J 9/16* (2006.01)
*G05B 19/042* (2006.01)
*G16Y 10/25* (2020.01)

(52) U.S. Cl.

CPC ........ *G05B 19/0426* (2013.01); *B25J 9/1605* (2013.01); *G05B 2219/23289* (2013.01); *G16Y 10/25* (2020.01)

(58) Field of Classification Search

CPC ....... G05B 19/0426; G05B 2219/23289; B25J 9/1605; G16Y 10/25
See application file for complete search history.

(56) References Cited

U.S. PATENT DOCUMENTS

| | | | | |
|---|---|---|---|---|
| 11,154,986 | B2 * | 10/2021 | Ben-Tsvi | G05B 19/41865 |
| 2016/0023351 | A1 * | 1/2016 | Kuffner | G06N 3/008 901/47 |
| 2020/0192664 | A1 | 6/2020 | Ionescu et al. | |
| 2022/0395979 | A1 * | 12/2022 | Beardsworth | B25J 9/1676 |

OTHER PUBLICATIONS

Chernova, et al., Confidence-Based Multi-Robot Learning from Demonstration, Int J Soc Robot, May 5, 2010, vol. 2, pp. 195-215.

(Continued)

*Primary Examiner* — Dylan M Katz
(74) *Attorney, Agent, or Firm* — Robert R. Aragona

(57) ABSTRACT

An embodiment for dynamic robotic task execution optimization with proof of concept (PoC) integration is provided. The embodiment may include receiving real-time and historical data from one or more IoT devices during an activity. The embodiment may also include identifying one or more tasks of the activity to be executed by a first robotic system. The embodiment may further include based on determining at least one first robot is unable to perform at least one task of the one or more tasks based on a confidence level of the at least one first robot to complete the at least one task falling below a pre-determined confidence level threshold, transmitting a PoC request to a second robotic system for the at least one task. The embodiment may also include causing the at least one first robot to execute one or more remedial actions.

20 Claims, 3 Drawing Sheets

(56) References Cited

OTHER PUBLICATIONS

Yasuda, Gen'ichi, Distributed Coordination Architecture for Cooperative Task Planning and Execution of Intelligent Multi-Robot Systems, Handbook of Research on Advanced Intelligent Control Engineering and Automation, 2015, 20 pages.
No Author, "Advanced digital manufacturing technology solutions", https://www.ibm.com/in-en/industries/manufacturing, https://web.archive.org/web/20240919022436/https://www.IBM.com/industries/manufacturing, Dec. 18, 2021, 7 pages.
No Author, "Workflow Management System Market Size, Share & Trends Analysis Report By Component (Software, Services), By Software, By Service, By Deployment, By Vertical, By Region, And Segment Forecasts, 2023-2030", https://web.archive.org/web/20250618124907/https://www.grandviewresearch.com/industry-analysis/workflow-management-systems-market, Jun. 18, 2025, 8 pages.
No Author, "Workflow automation software and solutions", https://web.archive.org/web/20250621150831/https://www.ibm.com/solutions/workflow, Jun. 21, 2025, 15 pages.
Volkmann et al., "Integration of a feasibility and context check into an OPC UA skill", https://www.sciencedirect.com/science/article/pii/S2405896321009678, Jan. 2021, pp. 276-281.

* cited by examiner

COMPUTER 101

PROCESSOR SET 110

PROCESSING CIRCUITRY 120

CACHE 121

COMMUNICATION FABRIC 111

VOLATILE MEMORY 112

PERSISTENT STORAGE 113

OPERATING SYSTEM 122

TASK EXECUTION PROGRAM 150

PERIPHERAL DEVICE SET 114

UI DEVICE SET 123

STORAGE 124

IoT SENSOR SET 125

NETWORK MODULE 115

END USER DEVICE 103

WAN 102

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

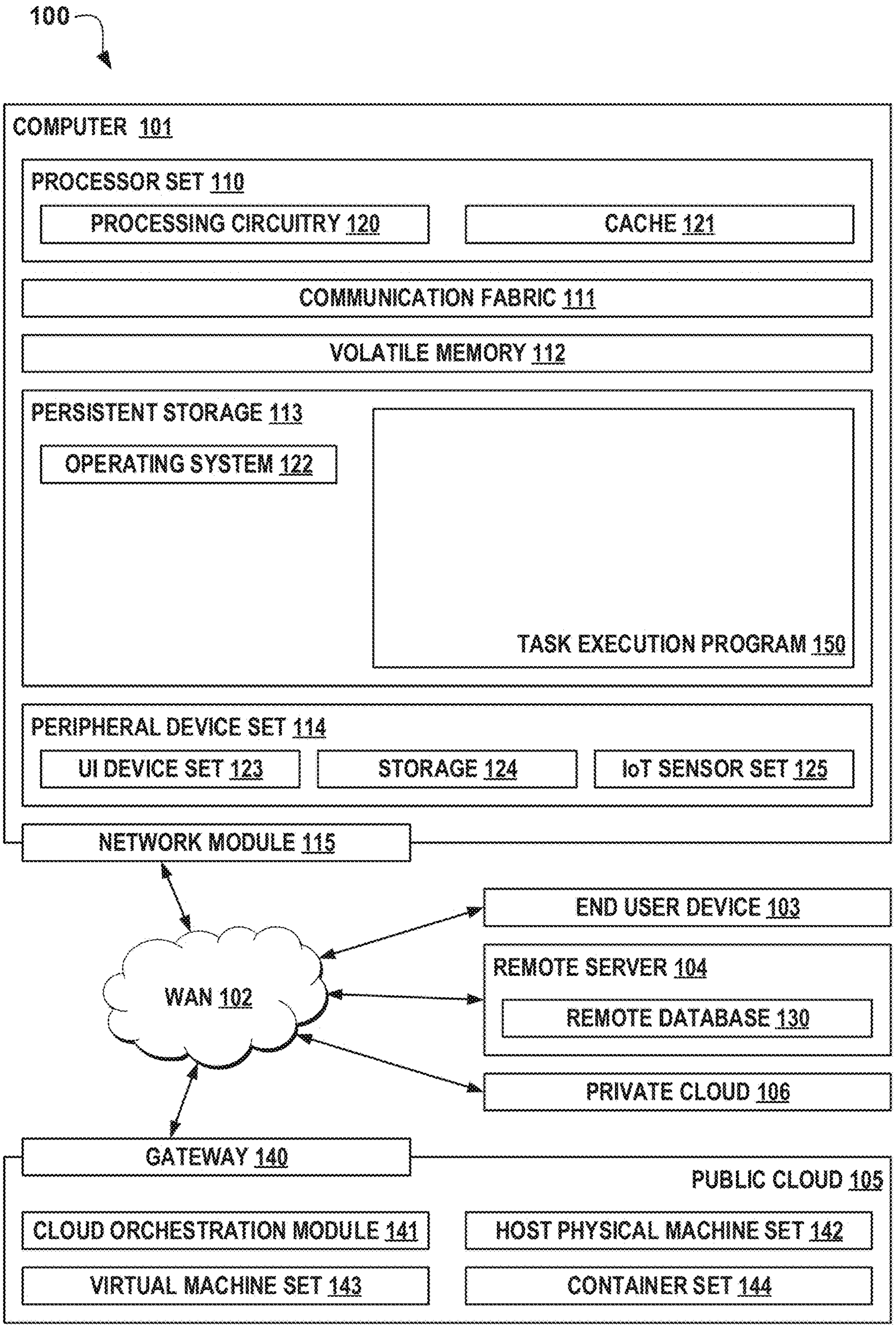

FIG. 1

DYNAMIC ROBOTIC TASK EXECUTION OPTIMIZATION WITH PROOF OF CONCEPT INTEGRATION

BACKGROUND

The present invention relates generally to the field of computing, and more particularly to a system for dynamic robotic task execution optimization with proof of concept (PoC) integration.

Machines, such as robots, are currently used to perform a wide variety of activities in an industrial environment. Some of these activities were previously exclusively performed by humans (e.g., repetitive tasks on a manufacturing assembly line), whereas other activities require heavy machinery to lift and/or move objects. Machines enable organizations, including manufacturers and construction companies, to carry out a wide variety of activities more seamlessly than humans, getting work done faster and with minimum wasted effort. These machines have differing skills and capabilities, and can perform activities individually and/or collaboratively. As automation becomes commonplace, the demand for machines and robotic technology is expected to increase in the coming decades.

SUMMARY

According to one embodiment, a method, computer system, and computer program product for dynamic robotic task execution optimization with proof of concept (PoC) integration is provided. The method, computer system, and computer program product may include receiving real-time and historical data from one or more IoT devices during an activity. The method, computer system, and computer program product may also include identifying one or more tasks of the activity to be executed by a first robotic system based on the real-time and the historical data. The method, computer system, and computer program product may further include based on determining at least one first robot in the first robotic system is unable to perform at least one task of the one or more tasks based on a confidence level of the at least one first robot to complete the at least one task falling below a pre-determined confidence level threshold, transmitting a PoC request to a second robotic system for the at least one task. The method, computer system, and computer program product may also include, upon a completion of the PoC request by the second robotic system, causing the at least one first robot to execute one or more remedial actions based on a result of the completion of the PoC request.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary computing environment according to at least one embodiment.

DETAILED DESCRIPTION

Figure 2:
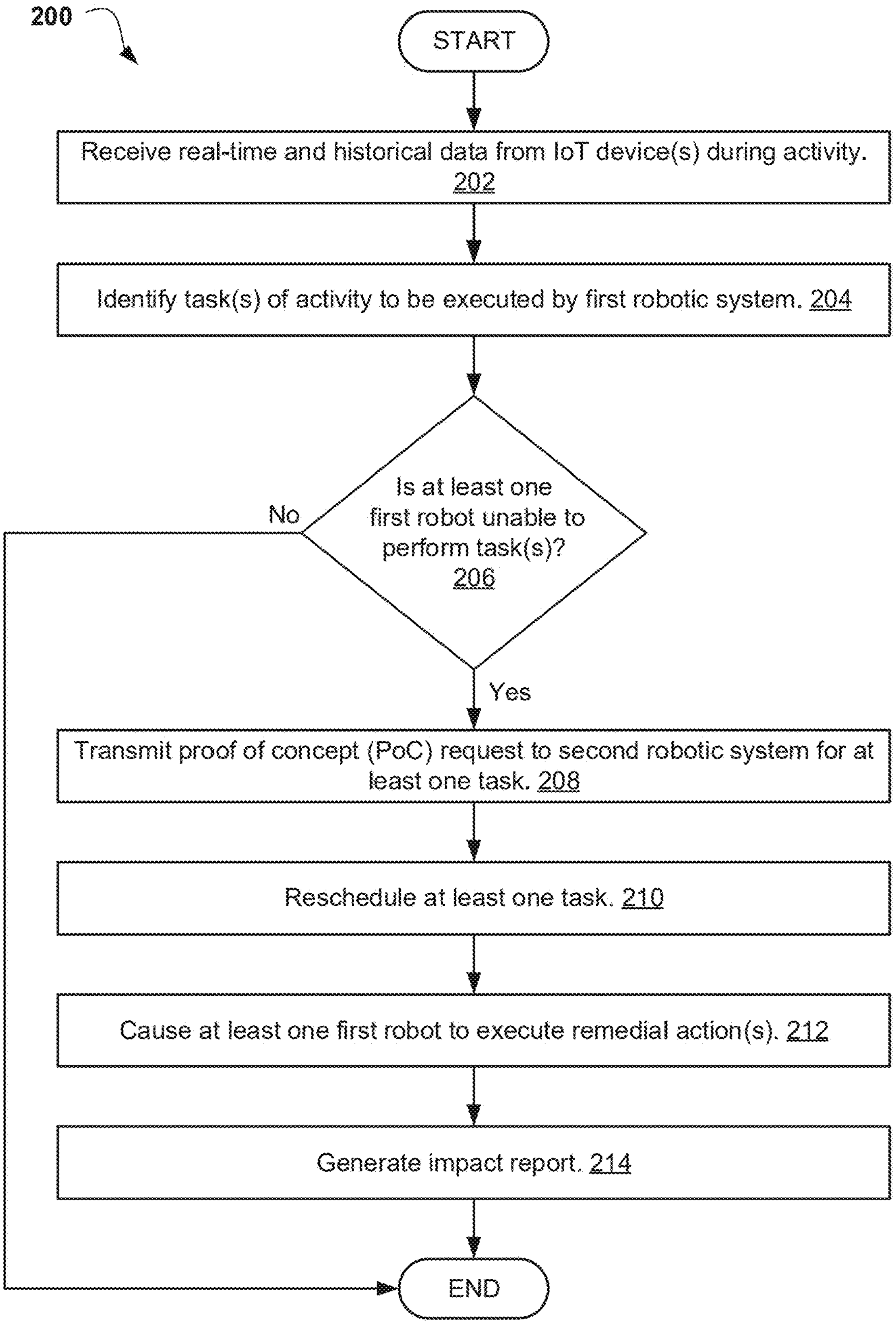
FIG. 2 illustrates an operational flowchart for dynamic robotic task execution optimization with proof of concept (PoC) integration in a dynamic robotic task execution optimization process according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for dynamic robotic task execution optimization with proof of concept (PoC) integration. The following described exemplary embodiments provide a system, method, and program product to, among other things, transmit a PoC request to a second robotic system for at least one task that at least one first robot in a first robotic system is unable to perform and, accordingly, upon a completion of the PoC request by the second robotic system, cause the at least one first robot to execute one or more remedial actions based on a result of the completion of the PoC request. Therefore, the present embodiment has the capacity to improve industrial manufacturing technology by optimizing robotic task execution and minimizing delays.

As previously described, machines, such as robots, are currently used to perform a wide variety of activities in an industrial environment. Some of these activities were previously exclusively performed by humans (e.g., repetitive tasks on a manufacturing assembly line), whereas other activities require heavy machinery to lift and/or move objects. Machines enable organizations, including manufacturers and construction companies, to carry out a wide variety of activities more seamlessly than humans, getting work done faster and with minimum wasted effort. These machines have differing skills and capabilities, and can perform activities individually and/or collaboratively. As automation becomes commonplace, the demand for machines and robotic technology is expected to increase in the coming decades. Currently, robotic systems are unable to dynamically adapt to task demands and uncertainties. This problem is typically addressed by a trial-and-error approach, where a workflow is adapted in response to a robotic failure. However, the trial-and-error approach fails to prevent manufacturing defects from occurring at all.

It may therefore be imperative to have a system in place to dynamically adapt to task demands and uncertainties. Thus, embodiments of the present invention may provide advantages including, but not limited to, optimizing robotic task execution and minimizing delays, dynamically adapting to task demands and uncertainties, and increasing efficiency and product quality. The present invention does not require that all advantages need to be incorporated into every embodiment of the invention.

According to at least one embodiment, when robots are performing an activity, real-time and historical data may be received from one or more IoT devices during the activity in order to identify one or more tasks of the activity to be executed by a first robotic system based on the real-time and the historical data. Upon identifying the one or more tasks of the activity, it may be determined whether at least one first robot in the first robotic system is unable to perform at least one task of the one or more tasks based on a confidence level of the at least one first robot to complete the at least one task falling below a pre-determined confidence level threshold so that based on determining the at least one first robot is unable to perform the at least one task, a PoC request may be transmitted to a second robotic system for the at least one task. Then, the at least one task may be rescheduled based on a timeframe for the second robotic system to complete the PoC request such that upon a completion of the PoC request by the second robotic system, the at least one first robot may be caused to execute one or more remedial actions based on a result of the completion of the PoC request. According to at least one embodiment, the remedial action may include causing the at least one first robot to increase a capability of one or more components of the at least one first robot. According to at least one other embodiment, the remedial action may include modifying a sequence of the one or more tasks of the activity to be executed by the first robotic system so that the first robotic system may be caused to execute the one or more tasks of the activity in accordance with the modified sequence.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to transmit a PoC request to a second robotic system for at least one task that at least one first robot in a first robotic system is unable to perform and, accordingly, upon a completion of the PoC request by the second robotic system, cause the at least one first robot to execute one or more remedial actions based on a result of the completion of the PoC request.

Referring to FIG. 1, an exemplary computing environment 100 is depicted, according to at least one embodiment. Computing environment 100 contains an example of an environment for the execution of at least some of the computer code involved in performing the inventive methods, such as a task execution program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage 113 allows writing of data, deletion of data and re-writing of data. Some familiar forms of persistent storage 113 include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices 114 and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database), this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may also include robotic devices, a 3D printer, cameras, lidar sensors, thermal imaging sensors, and/or any other device for performing labor related tasks.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments the private cloud 106 may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the task execution program 150 may be a program capable of receiving real-time and historical data from one or more IoT devices during an activity, transmitting a PoC request to a second robotic system for at least one task that at least one first robot in a first robotic system is unable to perform, upon a completion of the PoC request by the second robotic system, causing the at least one first robot to execute one or more remedial actions based on a result of the completion of the PoC request, optimizing robotic task execution and minimizing delays, dynamically adapting to task demands and uncertainties, and increasing efficiency and product quality. Furthermore, notwithstanding depiction in computer 101, the task execution program 150 may be stored in and/or executed by, individually or in any combination, end user device 103, remote server 104, public cloud 105, and private cloud 106. The task execution method is explained in further detail below with respect to FIG. 2. It may be appreciated that the examples described below are not intended to be limiting, and that in embodiments of the present invention the parameters used in the examples may be different.

Referring now to FIG. 2, an operational flowchart for dynamic robotic task execution optimization with PoC integration in a dynamic robotic task execution optimization process 200 is depicted according to at least one embodiment. At 202, the task execution program 150 receives the real-time and historical data from the one or more IoT devices during the activity. The one or more IoT devices may include, but are not limited to, robotic devices, a 3D printer, cameras, lidar sensors, thermal imaging sensors, and/or any other device for performing labor related tasks.

The real-time data may include the type of activity to be performed. Examples of an activity may include, but are not limited to, assembling objects in a manufacturing facility, removing objects in a disaster recovery area, and transporting objects from one location to another, (e.g., moving a shipping container from a ship to a dock). The real-time data may also include the one or more objects associated with the activity. Examples of the object may include, but are not limited to, construction materials, chemicals, debris from a building, an automobile, and/or any object capable of being manufactured or transported. The real-time data may further include sensor data. For example, the sensor data may include a temperature of a robotic device, a vibration of the robotic device, and/or a battery state of the robotic device (e.g., a battery state of 60%).

The historical data may include the workflow for the activity (e.g., the sequence of steps carried out to perform the activity), the procedures for conducting physical and chemical testing, digital twin simulations, and/or 3D printing, and the time required to complete the activity when the robotic device has increased capabilities and/or when the sequence of the activity is modified. The historical data may be stored in and retrieved from a database, such as remote database 130.

Then, at 204, the task execution program 150 identifies the one or more tasks of the activity to be executed by the first robotic system. The one or more tasks are identified based on the real-time and the historical data. The first robotic system may include, but is not limited to, a drone, an autonomous guided vehicle, 3D printers, anthropomorphic robots, and/or collaborative robots. For example, anthropomorphic robots may be used for welding, machining, and product assembly.

In embodiments of the present invention, use of the term task may be understood as a workflow, or the individual steps carried out to perform the activity, as described above with respect to step 202. For example, where the activity involves assembling an automobile, the one or more tasks may include spray painting the exterior, attaching the wheels and tires, attaching the doors, and installing the engine components.

According to at least one embodiment, the task execution program 150 may use the real-time data to create a digital model of the activity environment. For example, the camera may capture automobiles being manufactured on an assembly line. Once the digital model is created, the historical data may be leveraged to determine the tasks performed during the activity. For example, when assembling an automobile in the past, the tasks that are historically performed may include spray painting the exterior, attaching the wheels and tires, attaching the doors, and installing the engine components. The task execution program 150 may infer these same tasks will be performed again during the current activity.

According to at least one other embodiment, identifying the one or more tasks may also include identifying the individual robots that perform each task. For example, an anthropomorphic robot may execute the task of welding a door handle to a door, whereas autonomous guided vehicle may carry the components to and from the assembly line.

Next, at 206, the task execution program 150 determines whether the at least one first robot in the first robotic system is unable to perform the at least one task of the one or more tasks. The determination is made based on a confidence level of the at least one first robot to complete the at least one task falling below a pre-determined confidence level threshold. The first robot may be an individual robot that is part of the first robotic system. For example, the robot may be the drone.

According to at least one embodiment, in order to assess the confidence level, the task execution program 150 may use a combination of sensors, the historical data, and a confidence model. The first robot may be equipped with lidar sensors, accelerometers, and gyroscopes that may provide real-time data about the surrounding environment as well as a state of the first robot. For example, the accelerometer may provide information on how fast the first robot is performing the task, and the lidar sensors may measure the distances of objects. The historical data may include historical results of the first robot performing the at least one task. For example, the historical data may include the first robot damaged the object associated with the task. The confidence model may be trained on the sensor data and the historical data to compute the confidence level, which may be a score between 0% and 100%.

For example, the historical data may indicate that the battery power of the first robot drops below 50% and the first robot damaged the object associated with the task. The confidence model may make an association between the battery power dropping below 50% and the first robot damaging the object. Thus, when during the current task the real-time data indicates the battery has fallen below 50%, the confidence model may compute the confidence level as 40%. Contrarily, when during the current task the real-time data indicates the battery remains above 50%, the confidence model may compute the confidence level as 80%.

In another example, the historical data may indicate that there is an obstacle in the path of the first robot, and the first robot damaged the object associated with the task. The confidence model may make an association between the obstacle in the path and the first robot damaging the object. Thus, when during the current task the real-time data indicates the obstacle is in the path, the confidence model may compute the confidence level as 30%. Contrarily, when during the current task the real-time data indicates the path of the first robot is clear, the confidence model may compute the confidence level as 90%.

The pre-determined confidence level threshold may be set to 50%. Thus, when the confidence level of the first robot to complete the at least one task exceeds 50%, the determination may be made that the first robot is able to perform the at least one task. When the confidence level of the first robot equals or falls below 50%, the determination may be made that the first robot is unable to perform the at least one task. For example, when the confidence model computes the confidence level as 30%, the determination may be made the first robot is unable to perform the at least one task. In another example, when the confidence model computes the confidence level as 90%, the determination may be made the first robot is able to perform the at least one task.

According to at least one other embodiment, the task execution program 150 may consider a complexity level and/or safety level of the at least one task in computing the confidence level. The one or more factors that may be considered in evaluating the complexity level may include, but are not limited to, a number of objects involved, weights of the objects, distances between the objects, lighting conditions, and/or weather conditions. For example, dim lighting conditions and heavier objects may make the task more complex. Continuing the example, precipitation (e.g., rain or snow) may make the task more complex. The one or more factors that may be considered in evaluating the safety risk level may include, but are not limited to, the risk of a collision and/or the risk of injuring an employee. For example, higher risks of collision and higher injury risks may make the task less safe. The complexity level and the safety risk level of the at least one first task may be inversely proportional to the confidence level, where a higher complexity level and a higher safety risk level may result in a lower confidence level. For example, where the confidence model computes the confidence level as 80%, the one or more factors associated with the complexity level may lower the confidence level to below 40%. Continuing the example, the one or more factors associated with the safety risk level may lower the confidence level even further to 30%.

According to at least one further embodiment, the task execution program 150 may employ reinforcement learning during the performance of the at least one task. In this manner, the first robot may learn from difficulties or failures while performing the at least one task. For example, when the first robot damages an object, the first robot may learn from the failure and make more accurate confidence level predictions over time.

In response to determining the at least one first robot is unable to perform the at least one task (step 206, "Yes" branch), the dynamic robotic task execution optimization process 200 proceeds to step 208 to transmit the PoC request to the second robotic system for the at least one task. In response to determining the at least one first robot is able to perform the at least one task (step 206, "No" branch), the dynamic robotic task execution optimization process 200 ends.

Then, at 208, the task execution program 150 transmits the PoC request to the second robotic system for the at least one task. The task execution program 150 may send a signal to the second robotic system causing the second robotic system to complete the PoC request. The second robotic system may include similar robotic devices to those of the first robotic system. The second robotic system may include robots in a standby state in the activity area that are able to lend support to the first robotic system by completing the PoC request. The execution of the PoC request may determine whether the first robot is able to complete the at least one task. The type of PoC to be executed may be based on the type of task. The historical data may contain the procedures for executing the PoC request.

According to at least one embodiment, to complete the PoC request, the second robotic system may perform physical and/or chemical testing. When the physical and/or chemical testing is performed, the second robotic system may establish a controlled environment. The controlled environment may have similar conditions to the environment where the at least one task is to be performed. For example, the controlled environment may have a similar temperature and air quality to that of the activity area. Chemical testing may be performed when the at least one task involves the first robot handling chemicals. For example, when the first robot is to handle hydrogen peroxide, the chemical testing performed by the second robotic system may include handling hydrogen peroxide. Physical testing may be performed when the at least one task involves the first robot handling a physical object. For example, when the first robot is to weld two objects together, the physical testing performed by the second robotic system may include welding the two objects together.

According to at least one other embodiment, to complete the PoC request, the second robotic system may perform prototype printing. The task execution program 150 may cause the 3D printer in the second robotic system to print the one or more objects associated with the at least one task. For example, when the first robot is to install spark plugs into an automobile engine, the 3D printer may print the spark plugs.

According to at least one further embodiment, to complete the PoC request, the task execution program 150 may perform a digital twin simulation with the second robotic system. One or more machine learning models may be used in the digital twin simulation. An isolation forest model may detect unusual patterns in sensor data. For example, the isolation forest model may be trained on normal vibration patterns from welding arms. In the digital twin simulation, the isolation forest model may identify when any welding arm deviates from the norm. A long short term memory (LSTM) network may predict when a robot will fail based on operational history. The LSTM network may be trained on historical data of machine performance leading up to past failures. For example, in the digital twin simulation, the LSTM network may simulate future states of each robot and predict potential failures. A reinforcement learning model may optimize robotic parameters for efficiency and safety. For example, reinforcement learning model may be trained in the digital twin simulation to find the optimal speed and temperature settings for various robots. A random forest model may assess the level of risk associated with different operational scenarios. For example, in the digital twin simulation the random forest model may classifies the risk level of various simulated scenarios.

Next, at 210, the task execution program 150 reschedules the at least one task. The at least one task is rescheduled based on the timeframe for the second robotic system to complete the PoC request. The at least one task may be rescheduled to a later time in the activity such that the other tasks in the activity that do not need execution of the PoC request may still be performed. The longer the timeframe for the second robotic system to the complete the PoC request, the later in the activity the at least one task may be rescheduled. For example, when the at least one task is originally to be performed second, and it will take 5 minutes to complete the PoC request, the at least one task may be rescheduled to be performed fourth. In another example, when the at least one task is originally to be performed second, and it will take 10 minutes to complete the PoC request, the at least one task may be rescheduled to be performed sixth.

According to at least one embodiment, task dependencies of the at least one task may be considered when rescheduling the at least one task. For example, performance of another task may not be possible unless the at least one task is performed before the other task. When the performance of the other task depends on the performance of the at least one task, the at least one task may be rescheduled to be performed sooner rather than later. For example, when the at least one task is originally to be performed second, and when there is another task dependent upon the performance of the at least one task, and the at least one task can be performed either fourth, fifth, or sixth, the at least one task may be rescheduled to be performed fourth.

Then, at 212, the task execution program 150 causes the at least one first robot to execute one or more remedial actions. Upon the completion of the PoC request by the second robotic system, the at least one first robot executes the one or more remedial actions based on the result of the completion of the PoC request. The task execution program 150 may send a signal to the at least one first robot to execute the one or more remedial actions.

According to at least one embodiment, casing the at least one first robot to execute the one or more remedial actions may include causing the at least one first robot to increase a capability of one or more components of the at least one first robot. The increased capability may include, but is not limited to, self-installing a protective covering, replacing components, and/or providing the necessary power to components.

For example, the result of the completion of the PoC request may indicate that during the chemical testing, the arm of a robot in the second robotic system was damaged by the hydrogen peroxide. Continuing the example, when the at least one first robot has to handle the same chemicals, the at least one first robot may self-install a protective covering over arms of the at least one first robot. Alternatively, the at least one first robot may replace the arms with other arms having a material that does not get damaged from handling the chemicals. In another example, the result of the completion of the PoC request may indicate that during the 3D printing of the one or more objects and the subsequent interaction of the second robotic system with the one or more objects, the second robotic system dropped the 3D printed object. Continuing the example, when the at least one first robot has to handle the same object, the at least one first robot may replace the arms with other arms that can handle the weight of the one or more objects. In yet another example, the result of the completion of the PoC request may indicate that during the digital twin simulation, a welding arm of a robot in the second robotic system vibrated more than usual. Continuing the example, when the at least one first robot has to complete the same welding task, the at least one first robot may self-install a damper in the welding arm.

According to at least one other embodiment, causing the at least one first robot to execute the one or more remedial actions may include modifying a sequence of the one or more tasks of the activity to be executed by the first robotic system and causing the first robotic system to execute the one or more tasks of the activity in accordance with the modified sequence. During the execution of the PoC request, the second robotic system may perform the one or more tasks in different orders in order to determine the optimal order for completing the one or more tasks. Thus, the modified sequence may include the optimal order.

For example, the original sequence may include, in order, "Step A," Step B," "Step C," and "Step D." During the digital twin simulation, the task execution program 150 may determine that modifying the original sequence to be, in order, "Step C," "Step B," "Step D," and "Step A," resulted in the at least one task being completed successfully. In this example, the modified sequence may be, in order, "Step C," "Step B," "Step D," and "Step A." In another example, the original sequence may include, in order, "Step A," Step B," "Step C," and "Step D." During the digital twin simulation, the task execution program 150 may determine that modifying the original sequence to be, in order, "Step C," "Step B," "Step D," and "Step A," did not result in an injury to any employee. In this example, the modified sequence may be, in order, "Step C," "Step B," "Step D," and "Step A."

The at least one first robot may then execute the one or more tasks of the activity in accordance with the modified sequence. For example, the at least one first robot may execute, in order, "Step C," "Step B," "Step D," and "Step A," instead of "Step A," Step B," "Step C," and "Step D."

Next, at 214, the task execution program 150 generates the impact report. The impact report is generated based on the one or more remedial actions. The generated impact report may include a projected carbon footprint of the at least one first robot executing the one or more remedial actions. For example, increasing the power of the at least one first robot may require the use of more gasoline.

According to at least one embodiment, the generated impact report may also include cost implications of the at least one first robot executing the one or more remedial actions. For example, self-installing one component to replace another component may have a significant cost.

According to at least one other embodiment, a carbon and/or cost threshold may be set. With custom pre-configurations, the at least one first robot may continue to perform the at least one task based on determining the carbon footprint and/or cost is less than the carbon and/or cost threshold. For example, when the carbon threshold is 2 kilotons, and the carbon footprint of the at least one first robot is 1 kiloton, the at least one first robot may continue to execute the at least one task. In situations where the carbon footprint and/or cost is greater than the carbon and/or cost threshold, a prompt may be sent to an authority (e.g., a foreman or manager) to approve the continued execution of the at least one task. For example, when the carbon threshold is 2 kilotons, and the carbon footprint of the at least one first robot is 3 kilotons, the prompt may be sent to the authority to obtain approval to continue executing the at least one task.

Figure 3:
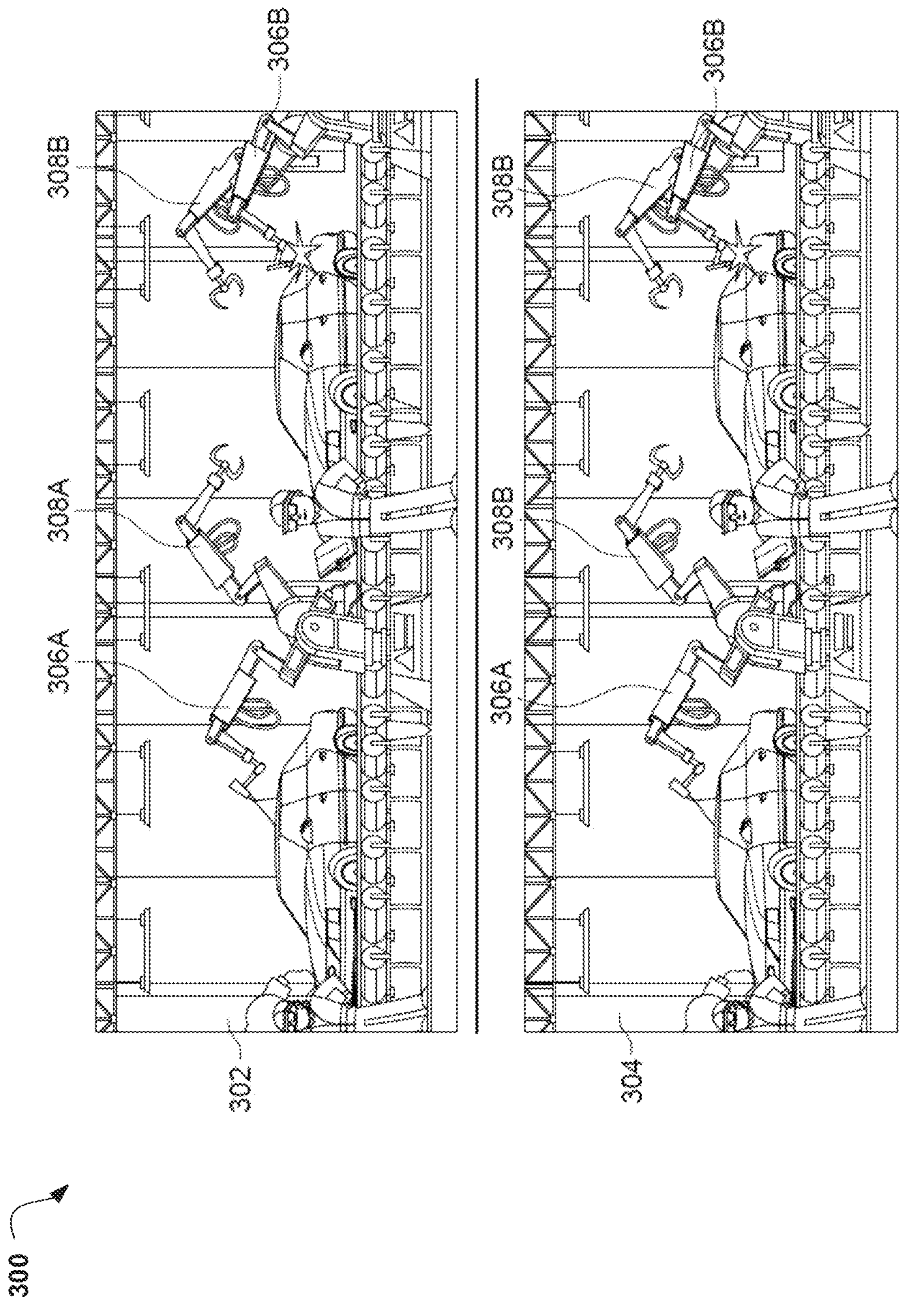
FIG. 3 is an exemplary diagram depicting a workflow before and during PoC integration according to at least one embodiment.

Referring now to FIG. 3, an exemplary diagram 300 depicting a workflow before and during PoC integration is shown according to at least one embodiment. In the diagram 300, a first workflow 302 may include the original workflow for performing the one or more tasks and the second workflow 304 may include the modified workflow. In the first workflow 302, a plurality of first robots 306A, 306B may be performing the one or more tasks and a plurality of second robots 308A, 308B may be in a standby state ready to assist the plurality of first robots 306A, 306B. The plurality of first robots 306A, 306B may have a confidence level to complete the at least one task that is below the pre-determined confidence level threshold. In the second workflow, the plurality of second robots 308A, 308B may execute one or more steps to complete the PoC request. Based on the result of the plurality of second robots 308A, 308B executing the PoC request, the original workflow may be modified to change the sequence of the one or more tasks. The plurality of first robots 306A, 306B may then perform the one or more tasks in accordance with the modified workflow.

It may be appreciated that FIGS. 2 and 3 provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of dynamic robotic task execution optimization with proof of concept (PoC) integration, the method comprising:

receiving real-time and historical data from one or more IoT devices during an activity;

identifying one or more tasks of the activity to be executed by a first robotic system based on the real-time and the historical data;

determining whether at least one first robot in the first robotic system is unable to perform at least one task of the one or more tasks based on a confidence level of the at least one first robot to complete the at least one task falling below a pre-determined confidence level threshold;

based on determining the at least one first robot is unable to perform the at least one task, transmitting a PoC request to a second robotic system for the at least one task, wherein the second robotic system includes other robots separate from the at least one first robot that are originally in a standby state in an area of activity that complete the PoC request; and upon a completion of the PoC request by the second robotic system, causing the at least one first robot to execute one or more remedial actions based on a result of the completion of the PoC request.

2. The computer-based method of claim 1, further comprising:

generating an impact report based on the one or more remedial actions, wherein the generated impact report includes a projected carbon footprint of the at least one first robot executing the one or more remedial actions.

3. The computer-based method of claim 1, further comprising:
rescheduling the at least one task based on a timeframe for the second robotic system to complete the PoC request.

4. The computer-based method of claim 1, wherein causing the at least one first robot to execute the one or more remedial actions further comprises:
causing the at least one first robot to increase a capability of one or more components of the at least one first robot.

5. The computer-based method of claim 1, wherein causing the at least one first robot to execute the one or more remedial actions further comprises:
modifying a sequence of the one or more tasks of the activity to be executed by the first robotic system; and
causing the first robotic system to execute the one or more tasks of the activity in accordance with the modified sequence.

6. The computer-based method of claim 1, wherein transmitting the PoC request to the second robotic system for the at least one task further comprises:
causing a 3D printer to print one or more objects associated with the at least one task.

7. The computer-based method of claim 1, wherein a complexity level and a safety risk level of the at least one first task is inversely proportional to the confidence level, wherein a higher complexity level and a higher safety risk level result in a lower confidence level.

8. A computer system, the computer system comprising:
one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
receiving real-time and historical data from one or more IoT devices during an activity;
identifying one or more tasks of the activity to be executed by a first robotic system based on the real-time and the historical data;
determining whether at least one first robot in the first robotic system is unable to perform at least one task of the one or more tasks based on a confidence level of the at least one first robot to complete the at least one task falling below a pre-determined confidence level threshold;
based on determining the at least one first robot is unable to perform the at least one task, transmitting a proof of concept (PoC) request to a second robotic system for the at least one task, wherein the second robotic system includes other robots separate from the at least one first robot that are originally in a standby state in an area of activity that complete the PoC request; and
upon a completion of the PoC request by the second robotic system, causing the at least one first robot to execute one or more remedial actions based on a result of the completion of the PoC request.

9. The computer system of claim 8, the method further comprising:
generating an impact report based on the one or more remedial actions, wherein the generated impact report includes a projected carbon footprint of the at least one first robot executing the one or more remedial actions.

10. The computer system of claim 8, the method further comprising:
rescheduling the at least one task based on a timeframe for the second robotic system to complete the PoC request.

11. The computer system of claim 8, wherein causing the at least one first robot to execute the one or more remedial actions further comprises:
causing the at least one first robot to increase a capability of one or more components of the at least one first robot.

12. The computer system of claim 8, wherein causing the at least one first robot to execute the one or more remedial actions further comprises:
modifying a sequence of the one or more tasks of the activity to be executed by the first robotic system; and
causing the first robotic system to execute the one or more tasks of the activity in accordance with the modified sequence.

13. The computer system of claim 8, wherein transmitting the PoC request to the second robotic system for the at least one task further comprises:
causing a 3D printer to print one or more objects associated with the at least one task.

14. The computer system of claim 8, wherein a complexity level and a safety risk level of the at least one first task is inversely proportional to the confidence level, wherein a higher complexity level and a higher safety risk level result in a lower confidence level.

15. A computer program product, the computer program product comprising:
one or more computer-readable tangible storage medium and program instructions stored on at least one of the one or more computer-readable tangible storage medium, the program instructions executable by a processor capable of performing a method, the method comprising:
receiving real-time and historical data from one or more IoT devices during an activity;
identifying one or more tasks of the activity to be executed by a first robotic system based on the real-time and the historical data;
determining whether at least one first robot in the first robotic system is unable to perform at least one task of the one or more tasks based on a confidence level of the at least one first robot to complete the at least one task falling below a pre-determined confidence level threshold;
based on determining the at least one first robot is unable to perform the at least one task, transmitting a proof of concept (PoC) request to a second robotic system for the at least one task, wherein the second robotic system includes other robots separate from the at least one first robot that are originally in a standby state in an area of activity that complete the PoC request; and
upon a completion of the PoC request by the second robotic system, causing the at least one first robot to execute one or more remedial actions based on a result of the completion of the PoC request.

16. The computer program product of claim 15, the method further comprising:
generating an impact report based on the one or more remedial actions, wherein the generated impact report includes a projected carbon footprint of the at least one first robot executing the one or more remedial actions.

17. The computer program product of claim 15, the method further comprising:
rescheduling the at least one task based on a timeframe for the second robotic system to complete the PoC request.

18. The computer program product of claim 15, wherein causing the at least one first robot to execute the one or more remedial actions further comprises:

causing the at least one first robot to increase a capability of one or more components of the at least one first robot.

19. The computer program product of claim 15, wherein causing the at least one first robot to execute the one or more remedial actions further comprises:

modifying a sequence of the one or more tasks of the activity to be executed by the first robotic system; and causing the first robotic system to execute the one or more tasks of the activity in accordance with the modified sequence.

20. The computer program product of claim 15, wherein transmitting the PoC request to the second robotic system for the at least one task further comprises:

causing a 3D printer to print one or more objects associated with the at least one task.

* * * * *